United States Patent [19]

Kawasaki et al.

[11] Patent Number: 5,011,391
[45] Date of Patent: Apr. 30, 1991

[54] METHOD OF MANUFACTURING GAS DISCHARGE DISPLAY DEVICE

[75] Inventors: Sadanobu Kawasaki; Jun Koishikawa, both of Kanagawa, Japan; Donald W. Kuty, Niagara Falls, N.Y.

[73] Assignee: E. I. Du Pont de Nemours and Company, Wilmington, Del.

[21] Appl. No.: 317,717

[22] Filed: Mar. 2, 1989

[30] Foreign Application Priority Data

Mar. 2, 1988 [JP] Japan .................................. 63-49438

[51] Int. Cl.$^5$ .............................................. H01J 9/24
[52] U.S. Cl. ........................................ 445/24; 264/61; 264/67
[58] Field of Search ...................... 445/24, 25; 264/61, 264/63, 67; 65/18.1; 156/89; 428/433

[56] References Cited

U.S. PATENT DOCUMENTS

| | | | |
|---|---|---|---|
| 3,559,190 | 1/1971 | Bitzer et al. | 445/24 |
| 3,873,171 | 3/1975 | Miyamoto et al. | 445/24 |
| 3,962,597 | 6/1976 | Clark et al. | 445/24 |
| 4,536,435 | 8/1985 | Vtsumi et al. | 428/433 |

Primary Examiner—Kenneth J. Ramsey

[57] ABSTRACT

A method of manufacturing a gas discharge display device comprising a pair of panel substrates arranged to oppose each other at a predetermined gap, at least one of said pair of panel substrates having on a surface thereof a plurality of electrodes which form discharge light-emitting display sections and an insulating barrier for defining the discharge light-emitting display section, the pair of panel substrates being encapsulated by an encapsulating member, characterized in that the method of forming the insulating barrier comprises the sequential steps of:

(1) forming a slip, which contains, as major component, finely divided electrically insulating solids which form a major constituent of the insulating barrier, and an organic binder, into a green sheet;

(2) processing the green sheet by forming holes in the green sheet in an array corresponding to discharge areas such that the green sheet remaining between the holes defines the insulating barrier;

(3) laminating the processed green sheet to a predetermined position on at least one of the panel substrates; and (4) firing the processed and laminated green sheet.

7 Claims, 4 Drawing Sheets

METHOD OF MANUFACTURING GAS DISCHARGE DISPLAY DEVICE

BACKGROUND OF THE INVENTION

1. Field of the Invention

The present invention relates to a method of manufacturing a gas discharge display device and, more particularly, to an improvement in a method of using an insulating barrier group to define a gas discharge section.

2. Description of the Related Art

As described in Japan Patent Application (OPI) Nos. 59-178476 and 58-16433, in manufacturing a gas discharge display device generally known as a plasma display panel, a pair of glass substrates are arranged to oppose each other at a predetermined gas discharge gap. Each glass substrate has, in its inner surface, a plurality of vertical electrodes covered with a dielectric layer as required and a plurality of horizontal electrodes at positions to oppose the vertical electrodes. The pair of glass substrates are hermetically encapsulated by an encapsulating material. A predetermined discharge gas is sealed in the gas discharge gap. The gas discharge gap is uniform at any part of the substrates. Discharge is performed in a predetermined space defined by the insulating barrier group. FIG. 1 shows a general structure of such a gas discharge display device and FIG. 2 is a sectional view taken along the line X of FIG. 1.

In order to form the insulating barrier group, a screen printing method, or a lift-off method using a mask, are usually adopted. The screen printing method is used most often. According to the screen printing method, as described, for example, in Japan Patent Application (OPI) No. 58-150248, an insulating powder such as a glass powder is made into a paste for printing. Using a mesh mask for screen printing, the paste is printed at a resolution of, e.g., about 3 pairs/mm (each pair consists of a line or dot and a space) for a small display to have a predetermined thickness. In this case, printing is repeated at least 3 to 4 times and a maximum of about 10 times while maintaining the above resolution until the paste has the predetermined thickness. Therefore, precise alignment is needed and the flowing of paste must be prevented in every printing step. The paste film thickness must be controlled at a high precision so that the final height of the paste is uniform. In this manner, this repeated paste printing process is very cumbersome and its yeild is low. In order to overcome this drawback, printing must be performed by a skilled worker with care and a long time, resulting in high costs.

SUMMARY OF THE INVENTION

An object of the present invention is to provide a method of manufacturing a gas discharge device based on a quite simple, high yield formation step of an insulating barrier group in order to remove the above described conventional drawbacks.

The inventors conducted intensive studies and found that the above drawbacks in forming an insulating barrier on a substrate are eliminated if the repeated screen printing method is not adopted, but instead, a green sheet having a predetermined size and shape, is adhered on the substrate and fired.

Therefore, according to the invention, there is provided a method of manufacturing a gas discharge display device comprising a pair of panel substrates arranged to oppose each other at a predetermined gap, at least one of said pair of panel substrates having on a surface thereof a plurality of electrodes which form discharge light-emitting display sections and an insulating barrier for defining the discharge light-emitting display section, the pair of panel substrates being encapsulated by an encapsulating member, characterized in that the method of forming the insulating barrier comprises the sequential steps of:

(1) forming a slip, which contains as the major components finely divided electrically insulating solids, which form a major constituent of the insulting barrier, and an organic binder, into a green sheet;

(2) processing the green sheet by forming holes in the green sheet in an array corresponding to discharge areas such that the green sheet remaining between the holes defines the insulating barrier;

(3) laminating the processed green sheet to a predetermined position on at least one of the panel substrates; and (4) firing the processed and laminated green sheet.

Production and yield of the insulating barrier are improved by the invention. Additionally, before or after the step of processing the green sheet into a predetermined size and shape, the green sheet may be tested as required to remove a defective portion thereof, thereby further improving yield.

DETAILED DESCRIPTION OF THE INVENTION

As the electrically insulating solids, which form a major constituent of the insulating barrier, a glass powder or a powder mixture of glass and ceramic can be used. An appropriate glass composition containing an inorganic material selected from the group consisting of alumina, silica, boron oxide, lead oxide and so on can be used. Various additives may be added in order to effect the thermal characteristics of the glass composition, e.g., glass transition point, a softening point, melting point, crystallization start point, and a crystal melting point, as well as melting viscosity and various other characteristics to be described later. Typical examples of the additives are titanium oxide, zinc oxide, barium oxide, potassium oxide, sodium oxide, calcium oxide, zirconium oxide, cadmium oxide, copper oxide, magnesium oxide, manganese oxide, bismuth oxide, and so on. However, the additives are not limited to these and include any material as far as it does not depart from the gist of the invention. Powders of inorganic compositions obtained from one of the materials or their combinations can be mixed and used as the inorganic materials. For example, a mixture of glasses or a mixture of glass and ceramics may be used.

When an insulating barrier of a gas discharge display device is to be actually formed, the following conditions must be satisfied:

(1) the insulating barrier must have sufficient adhesion to the substrate;

(2) when the insulating barrier is to be provided on an electrode, it must have sufficient adhesion to the substrate through the electrode;

(3) when the insulating layer is fired on the electrode material, the performance of the electrode must not be impaired electrically or physically;

(4) the thermal expansion coefficient of the insulating barrier must substantially match that of the substrate;

(5) the above features and the original performance and features of the insulating barrier must not be impaired by environmental conditions; and (6) the predetermined height and width of the insulating barrier must not be impaired by firing.

Above items (1) to (6) are mainly determined by the composition of the glass powder or the powder mixture of glass and ceramic to be used and its firing temperature. Regarding formation of an insulating barrier using a green sheet, since the green sheet is worked to have a predetermined size and shape, laminated on a substrate and fired, workability of the green sheet and simplicity and ease of the process are important factors of the invention. Fabrication and working of the green sheet will thus be described in more detail.

When the electrically insulating solids are to be formed into a slip, they are usually mixed with an organic binder, a plasticizer, a solvent and other additives and made into a slip. An organic polymer binder is preferable as the organic binder.

Examples of the organic polymer binder are vinyl polymers such as poly (vinyl butyral), poly (vinyl acetate), and poly (vinyl alcohol), cellulose polymers such as methyl cellulose, ethyl cellulose, hydroxyethyl cellulose, methylhydroxyethyl cellulose, atactic polypropylene, and polyethylene, silicone polymers such as poly (methyl siloxane) and poly (methylphenyl siloxane), and other various polymers such as polystyrene, a copolymer of butadiene/styrene, poly (vinyl pyrrolidone), polyamide, high molecular weight polyether, a copolymer of ethylene oxide/propylene oxide, and polyacrylamide. Acrylic polymers such as sodium polyacrylate, poly (alkyl acrylate), poly (alkyl methacrylate), a copolymer of alkyl acrylate/alkyl methacrylate, a copolymer of ethyl methacrylate/methyl acrylate, a terpolymer of ethyl acrylate/methyl methacrylate/methacrylic acid can also be used.

A monomer, oligomer, or low molecular weight polymer of the above polymers can be added in order to improve the nature of the polymer as the organic polymer binder.

As the plasticizer, diethyl phthalate, dibutyl phthalate, butyl benzyl phthalate, dibenzyl phthalate, alkyl phosphate, poly (alkylene glycol), poly (ethylene oxide), hydroxy ethylated alkylphenol, tricresyl phosphate, triethylene glycol diacetate, or a polyester plasticizer, or a combination of two or more of the enumerated materials may be used in accordance with the polymer to be used.

As the solvent, acetone, xylene, methanol, ethanol, isopropanol, methyl ethyl ketone, 1,1,1-trichloroethane, tetrachloroethylene, amyl acetate, 2,2,4-triethyl pentadiole-1,3-monoisobutylate, toluene, methylene chloride, or a fluorocarbon solvent, or a combination of one or more of the enumerated materials may be used in accordance with the polymer to be used.

As for the other additives, a dispersant, an anti-aggregation agent, a wetting agent, a releasant, an anti-forming agent, a leveling promotor, an anti-pinhole agent, and so on, or a combination of two or more of the enumerated materials can be used. The composition of the slip is not limited to the materials described above. For example, compositions of the slip and green sheet are described in greater detail in U.S. Pat. No. 4,655,864 to Rellick, issued Apr. 7, 1987, which is incorporated herein.

A normal milling method such as ball milling, sand milling, bead milling, and oscillating milling can be used for mixing the slip. As used herein, finely divided means the electrically insulating solids preferably have an average particle diameter in a range of about 1 to about 10 $\mu m$. The average particle diameter is not limited to this range. However, when the particle diameter is too large, it is difficult to increase the density of the insulating barrier group after firing, resulting in poor surface smoothness. On the contrary, when the particle diameter is excessively small, the viscosity of the slip becomes high to render preparation of the slip difficult and the amount of the organic polymer binder to be added must be increased, resulting in poor firing or low density after firing. Therefore, the average diameter must be appropriately selected.

As the coating method of the slip, a conventional method such as flood coating, air-knife coating, blade coating, extrusion coating and roll coating may be selected in accordance with the viscosity of the slip or the coating thickness.

As the coating base film, a polyester film, a polypropylene film, and so on can be used in accordance with size stability and heat resistance upon drying. However, other films can also be used. If a base film, such as a polyester film, which has an adhesion strength exceeding a predetermined level with respect to a green sheet is used, a silicone-based releasant or the like is preferably coated on the surface of the base film in order to control the adhesion property with the base film.

Coating need not be performed on the base film. For example, coating can be performed on a metal endless belt. After the coating is dried, the coated layer may be removed from the endless belt, thus forming only a green sheet. However, when the subsequent steps such as testing, working and so on are considered, it is practical to support the green sheet by the base film. Therefore, the following description is base on this assumption.

When the green sheet is tested as required before the next step of cutting or before the step and only a good green sheet is selected, a defective green sheet can be removed, thus increasing the processing yields.

In the processing step, holes are formed in the green sheet in an array corresponding to discharge areas such that the green sheet remaining between holes defines insulating barriers. Normally, in this step, round or square holes are formed to provide the respective discharge spaces as shown in FIG. 5 and FIG. 6 respectively. Elongated slit-like holes may be formed to provide a discharge space array as shown in FIG. 4. In some cases, the green sheet is cut along line Y (FIG. 4), the thus an end portion of the sheet is cut off from the remaining portion and discarded.

Various methods such as a punching method, a rotating drilling method, a laser beam method and a shear cutting method are available as practical methods for forming these holes. However, the hole-forming method is not limited to them. When a hole is to be formed, the base film may first be removed from the green sheet and thereafter a hole may be formed in the green sheet. However, when the mechanical strength of the green sheet itself and operation for adhering the green sheet with the base film are considered, it is practical to form holes in the green sheet and the base film simultaneously.

Alignment required for adhering a soft, worked green sheet on the substrate can be easily performed by, e.g., supporting the worked green sheet using a relatively hard flat plate having projections corresponding to the above described holes or the elongated slit-like holes and aligning the flat plate with the substrate. In this alignment step, the green sheet must overlap substrate such that the pitch of the formed electrodes coincides with the pitch of the holes in the green sheet and that the electrodes are exposed to the discharge space so as not to interfere with discharge.

When the green sheet with the base film is attached on the substrate, the green sheet is pressed before or after the base film is removed from it. The temperature, pressure, time, and press die are important factors to be considered in pressing.

The press temperature is set to be higher than room temperature so that the organic component in the green sheet is sufficiently softened, the green sheet can be easily adhered on the substrate, and the green density is increased to a certain degree by pressing. The press temperature is preferably 60° to 100° C., and more preferably 70° to 90° C. Therefore, the mixing ratio of the inorganic and organic components such as an organic polymer binder and a plasticizer of the green sheet must be set such that the green sheet does not have an excessive adhesion property at room temperature but has an appropriate adhesion property at 70° to 90° C.

The pressing pressure and pressing time may be determined considering the mass productivity together with the required adhesion property. When the bending resistance of the substrate is considered, a pressure of 50 kg/cm$^2$ or less is preferable. However, a higher pressure can be adopted if a cushion member or the like is used.

The insulating barrier can be formed at a high precision to have characteristics required by the manufacturers, such as the height and thickness of the barrier and the shape of the discharge space provided by the barrier by appropriately selecting the shape of the pressing die. Thus, the shape of the fired insulating barrier can be controlled to a certain degree.

As for the firing conditions, a general furnace normally used in the field of hybrid, integrated circuits can be used. Generally, the green sheet is fired at a temperature of about 400° to 650° C. and for about 5 to 20 minutes under appropriate gas supply/exhaust conditions. In the invention, the above described thermal characteristics of the inorganic powder material and the firing temperature conditions together impart a good performance to the insulating barrier. Therefore, it is preferable that the firing conditions are determined in accordance with the inorganic powder material used.

The temperature increase rate before the peak temperature is achieved is typically set at about 10°-15° C./min. It is preferabe to reduce the considerably temperature increase rate at a certain temperature in order to prevent a vigorous burn out of the organic component in the green sheet. Thereafter, the temperature can be increased up to the peak temperature at a rate suitable for desired production and sintering properties. This is in order to smoothly and completely burn the organic component of the green sheet.

Compared with gas discharge display devices manufactured by conventional methods, the gas discharge display device manufactured by the method according to the present invention has various excellent advantages as follows:

(1) the uniformity of the barrier thickness, i.e., the barrier height is good;

(2) the barrier has less internal defects, i.e., internal voids;

(3) since the width of the barrier and the shape of the discharge space provided by the barrier are constant, a highly uniform discharge characteristic can be obtained;

(4) the green sheet can be tested well, and the defect ratio is quite small; and (5) the manufacturing steps are simple and the production rate is increased.

EXAMPLE

Figure 1:
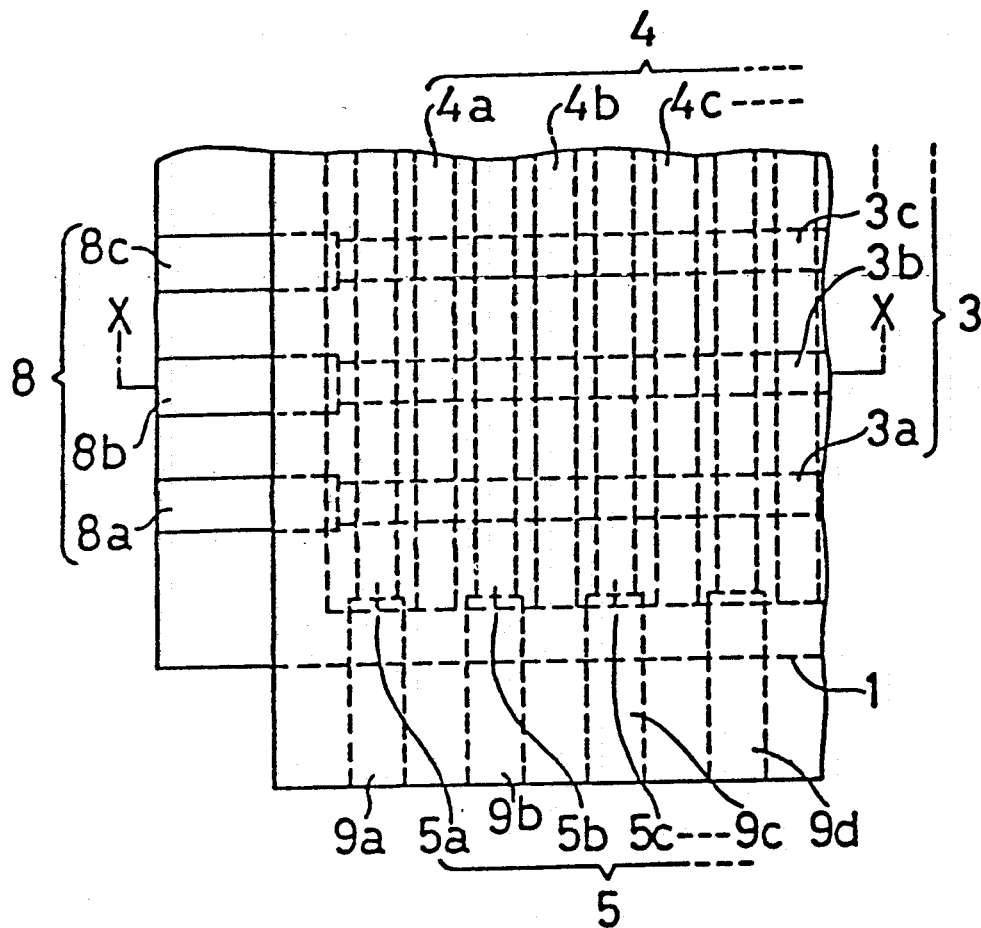
FIG. 1 shows a general structure of a gas discharge display device.

An example of the invention will be described in more detail with reference to the accompanying drawings. Note that the present invention is not limited to this. Note that in the figures, the suffixes a, b, c, . . . to the reference numerals denote individual matrix elements, and ' (dash) indicates an element before firing and containing an organic component.

Two types of glass powders A and B having the following compositions were made into a slip or slurry at a mixing ratio of 1:1 (weight ratio), and the slurry was coated on a base film 12, thereby obtaining a green sheet 4'.

| Glass Composition | A | B |
|---|---|---|
| Lead Oxide | 60 | 15 |
| Boron Oxide | 10 | 5 |
| Silica | 25 | 50 |
| Alumina | — | 15 |
| Calcium Oxide | — | 10 |
| Sodium Oxide | — | 5 |
| Titanium Oxide | 5 | — |

Figure 6:
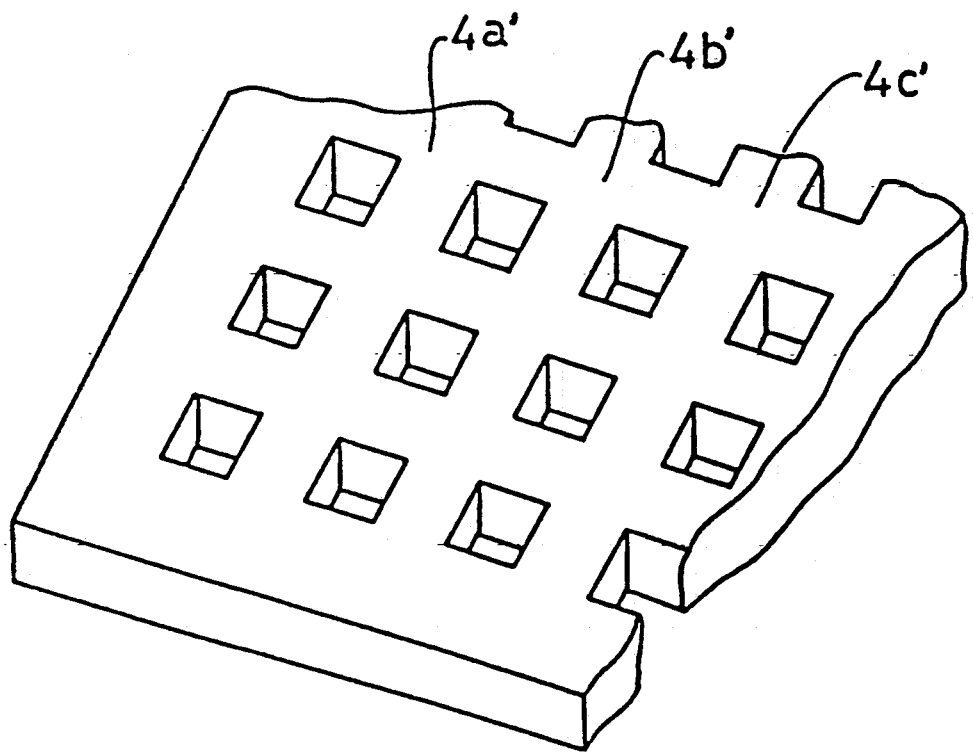
Figure 7:
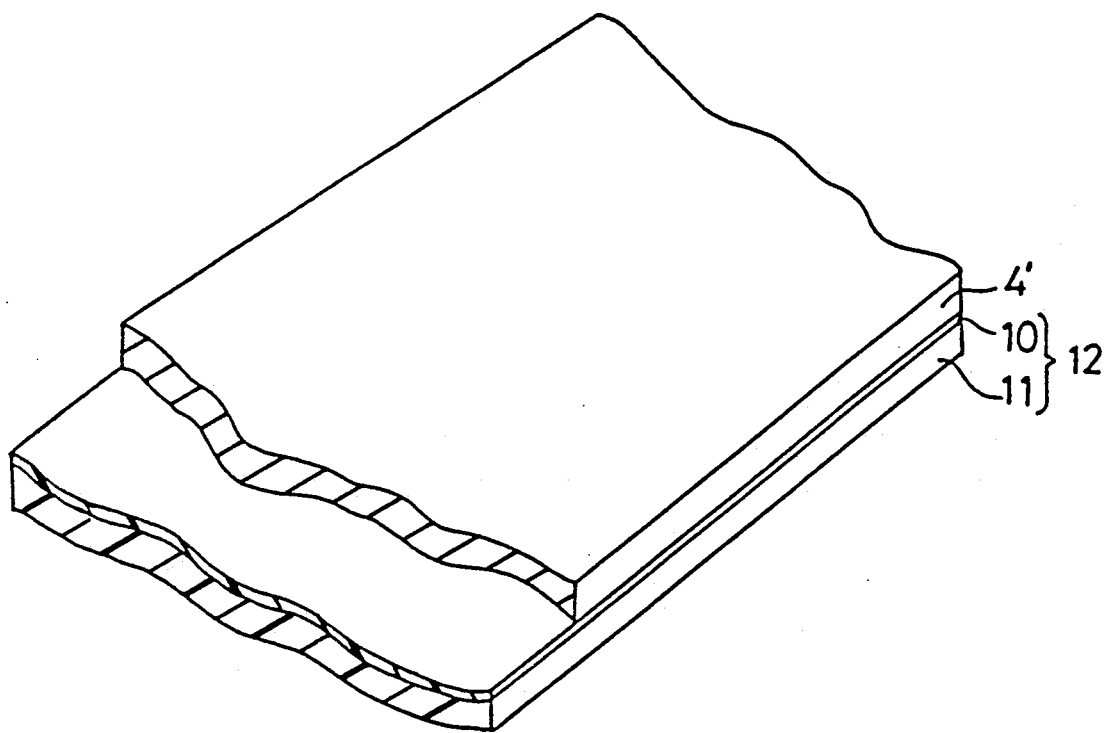

Square holes each having a side length of 0.15 mm were formed in the green sheet by punching at a pitch of 0.3 mm, thereby obtaining a sheet shown in FIG. 6.

Figure 2:
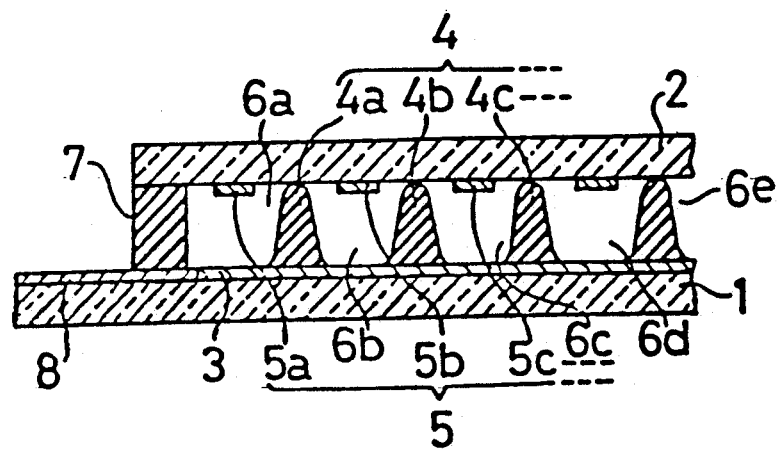
FIG. 2 is sectional view taken along the line X of FIG. 1.
Figure 3:
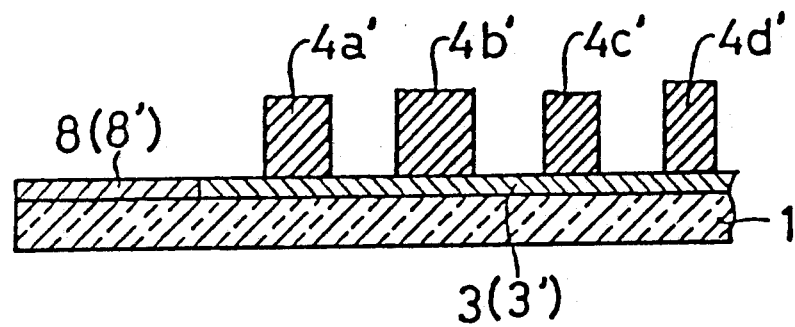
FIGS. 3 to 7 respectively show a green sheet according to the invention.
Figure 4:
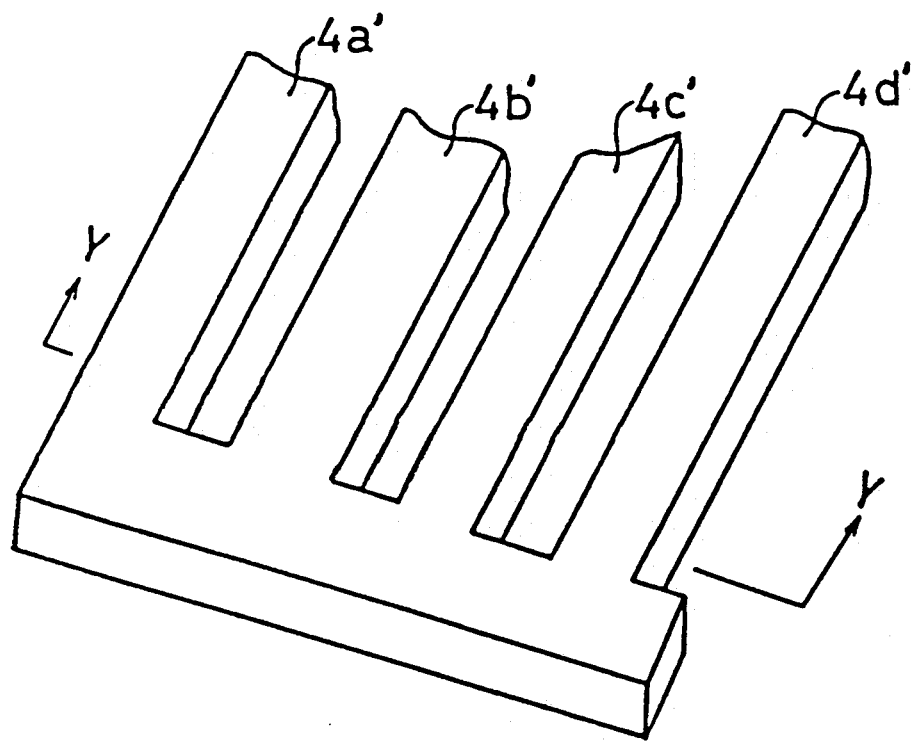
Figure 5:
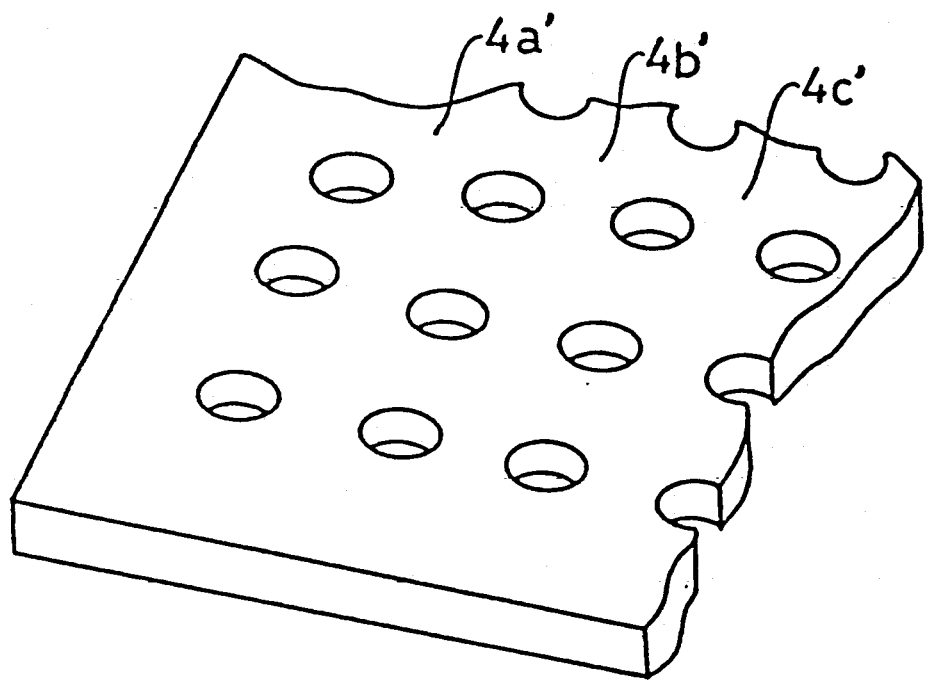

Substrates 1 and 2, on which electrodes 3 and 5 were formed, were prepared. The green sheet 4' having the plurality of holes was laminated at a predetermined position of substrate 1. A pressure of about 5 kg/cm$^2$ was applied on the resultant assembly at about 80° C. for about 10 minutes, so that the green sheet was adhered on substrate 1. The base film was removed from substrate 1. FIG. 2 and FIG. 3 shows the assembly in this state. In this state, the green sheet must overlap substrate 1 such that the pitch of the formed electrodes coincides with the pitch of the holes in the green sheet and that the electrodes are exposed to the discharge space so as not to interfere with discharge.

This green sheet was placed in a firing furnace together with substrate 1 and fired at 570° C. for 10 minutes. The temperature increase rate was set about 20° C./min, and was considerably reduced when the furnace was at about 450° C. The furnace was kept at a substantially constant temperature for about 20 minutes. Thereafter, the temperature was increased up to the peak temperature at a predetermined rate. This is in order to smoothly and completely burn the organic component of the green sheet.

Finally, substrate 2 was laid on a predetermined position of substrate 1 and fired at a low temperature, thereby forming an encapsulating member 7 using a glass compound having a low melting point.

Through the above steps, a gas discharge display device having a discharge dot pitch of about 3 dots/mm was produced.

What is claimed is:

1. A method of manufacturing a gas discharge display device comprising a pair of panel substrates arranged to oppose each other at a predetermined gap, at least one of said pair of panel substrates having on a surface thereof a plurality of electrodes which form discharge light-emitting display sections and an insulating barrier for defining the discharge light-emitting display section, said pair of panel substrates being encapsulated by an encapsulating member, characterized in that the method of forming the insulating barrier comprises the sequential steps of:
   (1) forming a slip, which contains, as the major component, finely divided electrically insulating solids which form a major constituent of the insulating barrier and an organic binder, into a green sheet;
   (2) processing said green sheet by forming holes in the green sheet in an array corresponding to discharge areas such that the green sheet remaining between the holes defines the insulating barrier;
   (3) laminating said processed green sheet to a predetermined position on at least one of said panel substrates; and
   (4) firing said processed and laminated green sheet.

2. The method of claim 1 in which the slip further includes an organic solvent.

3. The method of claim 2 in which the slip is formed into a green sheet by the process comprising the sequential steps of:
   coating a layer of the slip onto a substrate; and
   drying the coated layer of slip to remove organic solvent therefrom.

4. The method of claim 1 in which the finely divided electrically insulating solids comprise glass powder or a powder mixture of glass and ceramic.

5. The method of claim 4 in which the glass comprises an inorganic material selected from the group consisting of alumina, silica, boron oxide, lead oxide, calcium oxide, sodium oxide, titanium oxide and mixtures thereof.

6. The method of claim 5 in which the glass powder contains 60% wt. lead oxide, 10% wt. boron oxide, 25% wt. silica and 5% wt. titanium oxide or 15% wt. lead oxide, 5% wt. boron oxide, 50% wt. silica, 15% wt. alumina, 10% wt. calcium oxide and 5% wt. titanium oxide.

7. The method of claim 1 in which the organic binder is an organic polymer.

* * * * *